United States Patent [19]

Naruse et al.

[11] Patent Number: 4,975,730
[45] Date of Patent: Dec. 4, 1990

[54] PHOTOGRAPHIC ENLARGER

[75] Inventors: Kazuhiro Naruse; Taketoshi Kawamura, both of Osaka, Japan

[73] Assignee: Minolta Camera Co., Ltd., Osaka, Japan

[21] Appl. No.: 408,480

[22] Filed: Sep. 15, 1989

Related U.S. Application Data

[63] Continuation of Ser. No. 275,427, Nov. 22, 1988, abandoned.

[30] Foreign Application Priority Data

Nov. 25, 1987 [JP] Japan ................................ 62-298318

[51] Int. Cl.$^5$ ............................................ G03B 27/80
[52] U.S. Cl. ......................................... 355/38; 355/68
[58] Field of Search ............................... 355/38, 68, 77

[56] References Cited

U.S. PATENT DOCUMENTS 4,469,437  9/1984  Yuasa et al. ........................... 355/68
4,551,011  11/1985  Yuasa et al. ........................... 355/35

Primary Examiner—L. T. Hix
Assistant Examiner—D. Rutledge
Attorney, Agent, or Firm—Willian Brinks Olds Hofer Gilson & Lione

[57] ABSTRACT

A photographic enlarger for carrying out a printing operation using exposure data fed directly from an external analyzer by converting the data into suitable exposure data for the enlarger. The enlarger can function efficiently even when a condition of the optical system of the enlarger, for example, the magnification or aperture size, of the optical system, is changed.

4 Claims, 7 Drawing Sheets

PHOTOGRAPHIC ENLARGER

This application is a continuation of application Ser. No. 07/275,427, filed Nov. 22, 1988, now abandoned.

BACKGROUND OF THE INVENTION

1. Field of the Invention

The present invention relates to a photographic enlarger which carries out a printing operation using exposure data fed by an external analyzer, which analyzer is capable of detecting a condition of the optical system thereof, for example, the magnification or the aperture size.

2. Description of the Prior Art

An enlarger which prints a film using exposure data fed directly from an external analyzer such as VCNA (Video Color Negative Analyzer) is known. Said enlarger memorizes the difference between exposure data to make a best print (hereinafter, referred to as "the best print data") obtained by said enlarger itself and that obtained by the external analyzer and converts the exposure data fed by the external analyzer in accordance with the memorized difference so that the exposure data may be suitable for said enlarger.

However, the above-mentioned enlarger is constructed on the assumption that the condition of the optical system of the enlarger is not changed from the best print condition. Therefore, the enlarger cannot function well in a case where the condition of the optical system is changed, for example, in a case where the magnification or the aperture is changed.

On the other hand, another type of enlarger is shown in U.S. Pat. No. 4,469,437. Even if the condition of the optical system is changed from the best print condition, the enlarger in U.S. Pat. No. 4,469,437 can obtain the best print data without any complicated process.

However, said enlarger is constructed for private use, and cannot carry out a mass printing operation in accordance with the exposure data fed by an external analyzer.

SUMMARY OF THE INVENTION

An object of the present invention is to provide a photographic enlarger which can carry out a printing operation with exposure data fed directly to the enlarger by an external analyzer by converting said data into suitable exposure data for said enlarger, and, more particularly, which can function well in a case where the condition of the optical system of the enlarger is changed.

According to the present invention, the photographic enlarger comprises, light emitting means, first light measuring means for directly measuring the amount of light emitted from the light emitting means, second light measuring means for measuring the amount of light emitted from the light emitting means after passing through an optical system of said enlarger, first output means for outputting first best print data fed by an external analyzer, second output means for outputting second best print data obtained by said enlarger, first ratio output means for outputting a first ratio of the amount of light measured by said first light measuring means to that measured by said second light measuring means when said light emitting means emits light under the same condition of the optical system as that when the best print data are obtained by said enlarger, second ratio output means for outputting a second ratio of the amount of light measured by said first light measuring means to that measured by said second light measuring means when said light emitting means emits light under a different condition of the optical system from that when the best print data are obtained by said enlarger, third output means for outputting the exposure data fed by the external analyzer, calculating means for calculating the amount of light to be emitted from said light emitting means in accordance with said first and second best print data, said first and second ratios and the exposure data, and control means for controlling said light emitting means to emit light in the amount calculated by said calculating means.

BRIEF DESCRIPTION OF THE DRAWINGS

FIG. 4 is a flowchart which particularly shows a routine for an operation when the ENT key is turned on;

FIG. 5 is a flowchart which particularly shows a routine for an operation when the ORG key is turned on;

FIGS. 6a and 6b, which are continuous onto each other, are flowcharts which particularly show a routine for an operation when the EXP key is turned on;

FIG. 7 is a flowchart which particularly shows a routine for an operation when the TRN key is turned on;

FIG. 8 is a flowchart which particularly shows a routine for an operation when the MAG key is turned on;

FIG. 10 is a flowchart which particularly shows a routine for an operation when the ANM key is turned on;

FIG. 11 is a flowchart which particularly shows a routine for an operation when the ANS key is turned on;

FIG. 12 is a flowchart which particularly shows a routine for an operation when the power source is turned on.

DESCRIPTION OF THE PREFERRED EMBODIMENT

The following description, taken in conjunction with the drawings, sets forth the presently preferred embodiment of the invention. The embodiment of the invention disclosed herein is the best mode contemplated by the inventors for carrying out their invention in the commercial photographic printing field, although it should be understood that various modifications can be accomplished within the present invention.

Prior to describing the preferred embodiment, a description is made herein of the principle of the exposure data determination for the photographic enlarger according to the present invention.

Under a specific condition of the optical system of the enlarger, exposure data to make a best print for a standard exposed film is found and set in the enlarger. Next, best print data for the standard exposed film obtained by an external analyzer is set with a predetermined operation. The difference between said two data, namely, $\Delta T$ is then calculated and memorized. Then a predetermined emission from a light emitting means is carried out with no film in the enlarger. In accordance with data $MS_1$ representative of the output of a first light measuring means and data $AS_1$ representative of the output of a second light measuring means at the first emission, a calculation in accordance with the following formula (1) is performed:

$$CS = MS_1/AS_1 \qquad (1)$$

Then, under another condition of the optical system where the magnification and/or the aperture are changed from the first condition, the predetermined emission from the light emitting means is again carried out with no film in the enlarger.

Another calculation is made in accordance with the following formula (2) with data $MS_2$ being the output of the first light measuring means, data $AS_2$ being the output of the second light measuring means and CS being the result calculated by formula (1):

$$\Delta TC = 100 \cdot \log_{10}(CA \cdot AS_2/MS_2) \qquad (2)$$

In the above formula (2), $CS \cdot AS_2/MS_2$ represents the exposure data in linear scale in accordance with the changed condition of the optical system, and said exposure data in linear scale are converted into exposure data in logarithmic compression scale (CC scale) suitable for being set in the present enlarger.

Under the changed condition, the exposure data fed by the external analyzer, namely DATA (ANALYZER) is revised by $\Delta T$ and $\Delta TC$ in accordance with the following formula (3) so as to provide data for making a best print, namely:

$$DATA(BEST\ PRINT) = DATA(ANALYZER) + \Delta T - \Delta TC \qquad (3)$$

In this way, a photographic enlarger according to the present invention is capable of obtaining direct exposure data suitable for said enlarger using the exposure data fed by the external analyzer as well as by detecting a change of the condition of the optical system.

Figure 1:
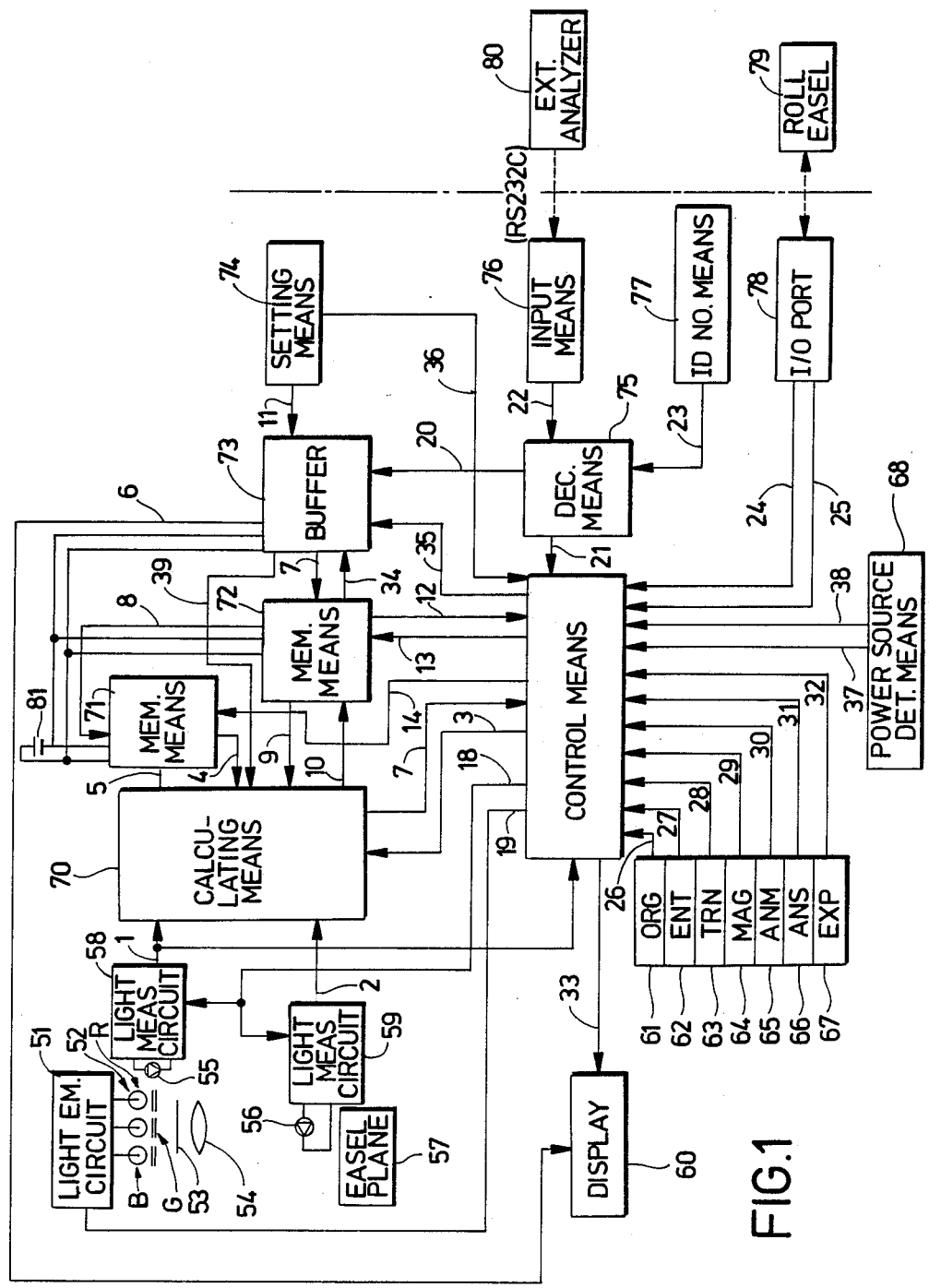
FIG. 1 is a block diagram of a photographic enlarger according to a preferred embodiment of the present invention.

FIG. 1 is a block diagram of the whole circuit of a photographic enlarger according to a preferred embodiment of the present invention. In this figure, the external analyzer 80 and the roll easel 79 are external equipment connected with the enlarger.

Reference numbers 51 and 52 represent the light emitting means, 55 and 58 represent a first light receiving means, 56 and 59 represent a second light receiving means, 71 represents a memory means, 70 represents a calculating means for performing first and second calculation operations and an exposure data calculation operation and 76 represents an input means.

To control the operation of the present enlarger, ORG key 61, ENT key 62, TRN key 63, MAG key 64, ANM key 65, ANS key 66 and EXP key 67 are connected with a control means 69, respectively.

ORG key 61 is provided for setting a condition where an exposure operation is carried out using exposure data set in the setting means 74.

ENT key 62 is provided for storing data in the memory means 72, which data has been set manually in the setting means 74 and held in buffer 73. TRN key 63 is provided to initiate memorizing the difference (hereinafter, referred to as "the translate data") between the best print data obtained by the enlarger and that obtained by the external analyzer 80 so that the present enlarger may carry out an exposure operation using data fed by the external analyzer 80.

MAG key 64 is provided to initiate calculating revised data in accordance with a change of the condition of the optical system of the enlarger, if an exposure operation is carried out under a condition of the optical system different from the condition thereof where the translate data are set by TRN key 63. ANM key 65 is provided to initiate memorizing the measured and calculated data at a specific point of an arbitrary film, when carrying out an exposure operation using the function of an internal analyzer as mentioned later.

ANS key 66 is provided to initiate calculating the exposure data so that a specific point of a film to be printed may be printed with the same color balance and density as a specific point of the arbitrary film used during operation of the ANM key 65. EXP key 67 is provided for carrying out the exposure operation.

The light emitting means comprises three light sources 52 consisting of xenon tubes connected with a light emitting circuit 51, said light emitting circuit controlling the light emitting operation of the light sources 52 in accordance with signals fed by the control means 69. The xenon tubes compose the light sources B, G and R, respectively, with blue, green and red filters disposed in front thereof.

The light emitted from the light sources 52 are projected onto a film at film set position 53 and, through a lens 54, onto the easel plane 57 or onto a printing paper placed thereon, whereon an image is formed.

Cell 55 is a light receiving element installed to face the light sources 52 for monitoring the amount of light emitted from respective light sources B, G and R. Light measuring circuit 58 integrates the output of cell 55 and converts the integrated output into a digital signal suitable for the process in the calculating means 70. A spot light receiving element, cell 56, receives incident light at a point on the easel plane 57 after the light has passed through the optical system. Light measuring circuit 59 integrates the output of cell 56 and converts the integrated output into a digital signal suitable for the process in the calculating means 70. Cell 56 can be manually moved and set at any desired position on the easel plane 57.

In FIG. 1, the control means 69, the calculating means 70, the memory means 71, the memory means 72, the buffer 73, the deciding means 75, the input means 76, the ID No. means 77 and the roll easel I/O port 78, respectively, each represent functions of a microcomputer. That is to say, the present enlarger includes a microcomputer in practice which is constructed to perform all the functions of those blocks. And further, the data of the memory means 71, the memory means 72 and the buffer 73 are prevented from being accidentally lost by a backup battery 81 when the power source is turned off.

For representing the exposure data, the logarithmic compression scale (CC scale) is used in the setting means 74 or on the display 60. In the following, the exposure data for light sources B, G and R are distinguished by marks B, G and R, respectively.

The operation of the present enlarger will now be explained in accordance with the flowcharts shown in FIGS. 2 through 13.

Figure 2:
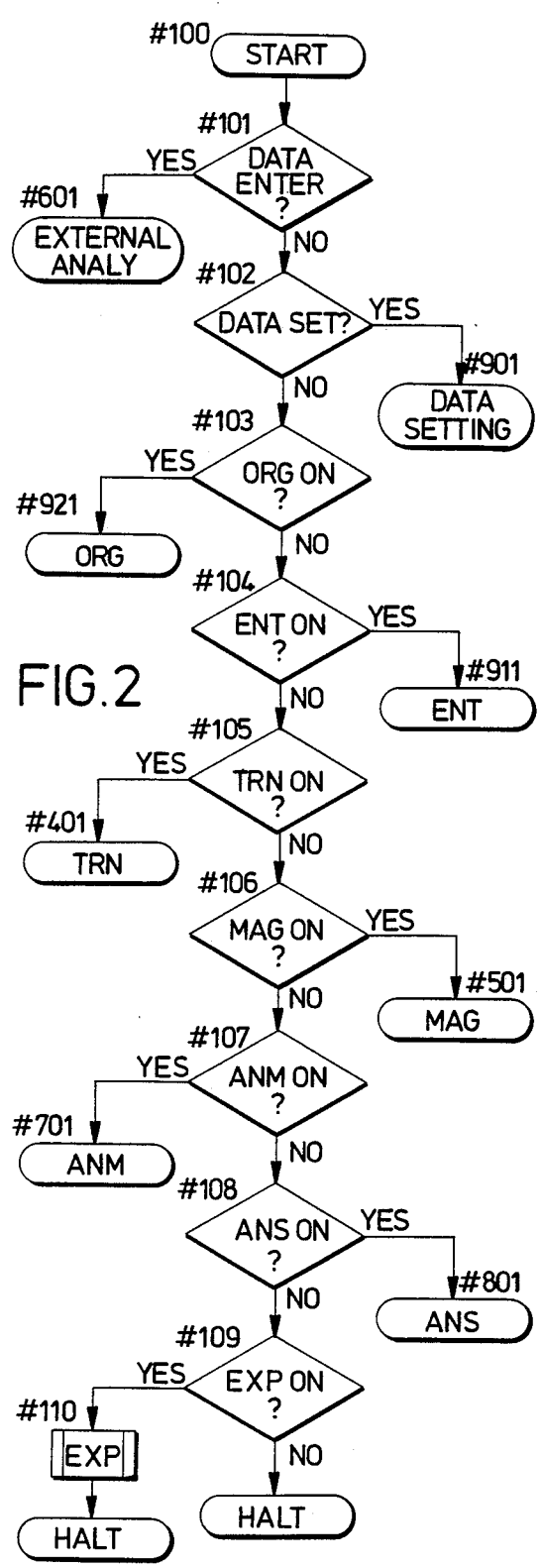
FIG. 2 is a flowchart which shows a routine for the basic operation of the enlarger of FIG. 1.

FIG. 2 is a flowchart illustrating a basic operation of the present enlarger, wherein the control means 69 of said enlarger deciding which key is turned on at the HALT condition thereof.

ORG key 61, ENT key 62, TRN key 63, MAG key 64, ANM key 65, ANS key 66 and EXP key 67 are all effective to start the enlarger by interrupting the HALT condition thereof. Further, when exposure data is set in the setting means 74, or when external data enters the input means 76, the present enlarger is also started.

Figure 9:
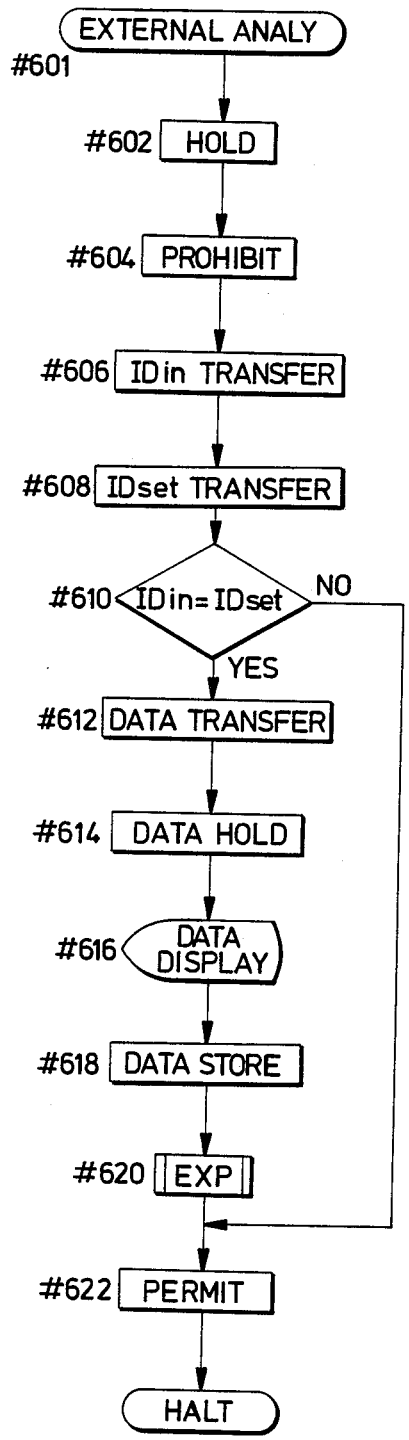
FIG. 9 is a flowchart which particularly shows a routine for an operation when the exposure data are fed by the external analyzer.

If data are fed into the input means 76 by the external analyzer 80, the control means 69 of the enlarger returns from the HALT condition, judges the incoming of the external data at step #101, proceeds to step #601 and performs thereat the operation in accordance with a flowchart of the external ANALY routine shown in FIG. 9. If the exposure data are set in the setting means 74, a signal enters the control means 69 via line 36, so the control means 69 returns from the HALT condition, judges the exposure data being set at step #102, proceeds to step #901 and performs thereat the operation in accordance with a flowchart shown in FIG. 3.

Figure 4:
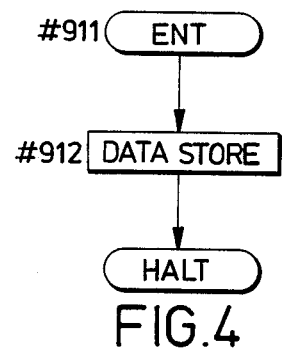
Figure 5:
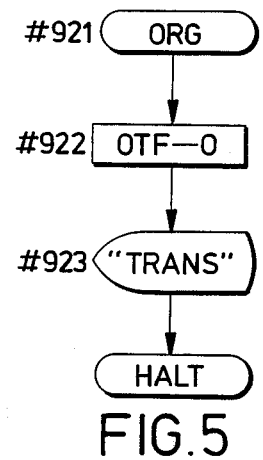
Figure 6A:
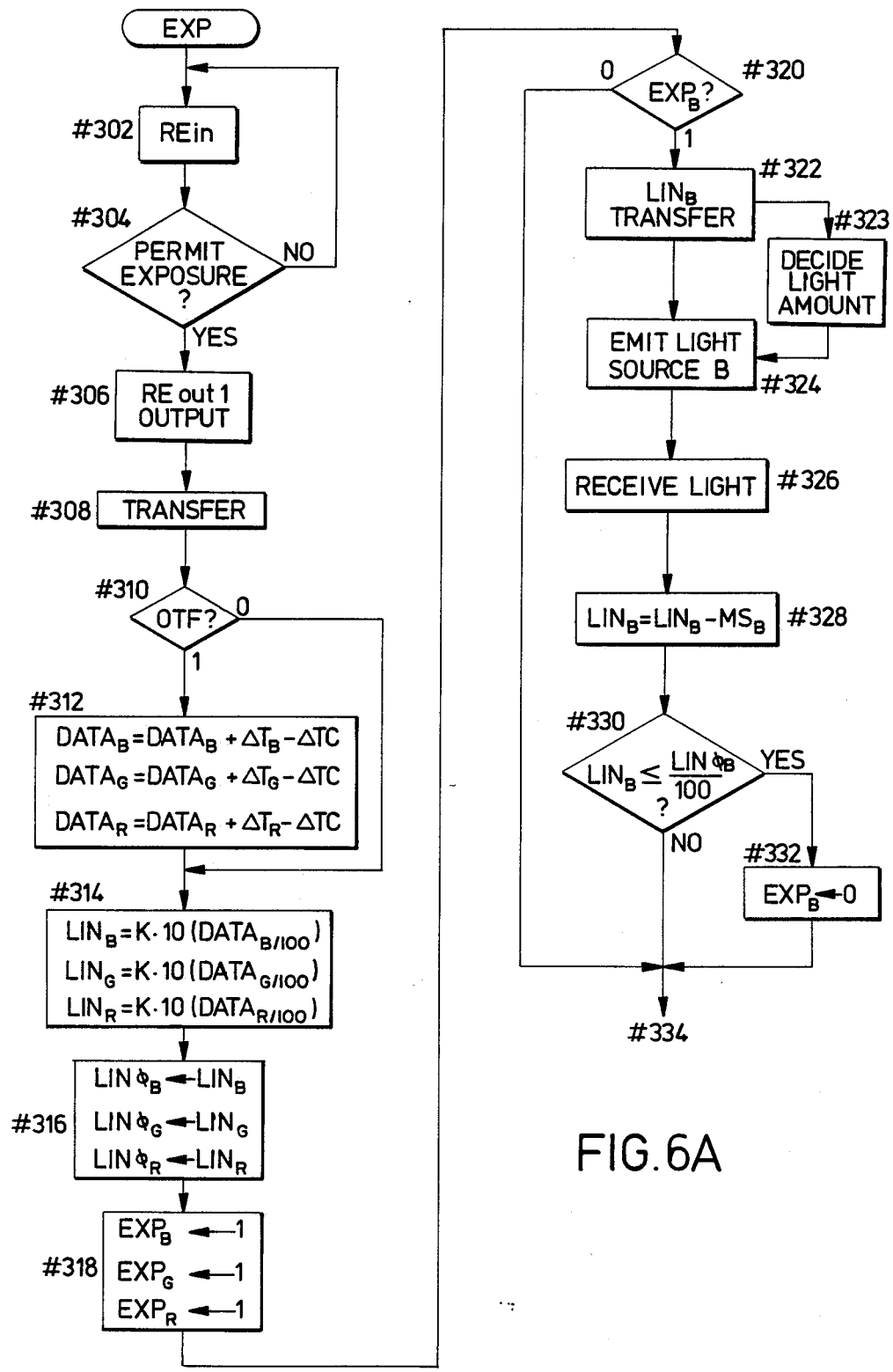
Figure 6B:
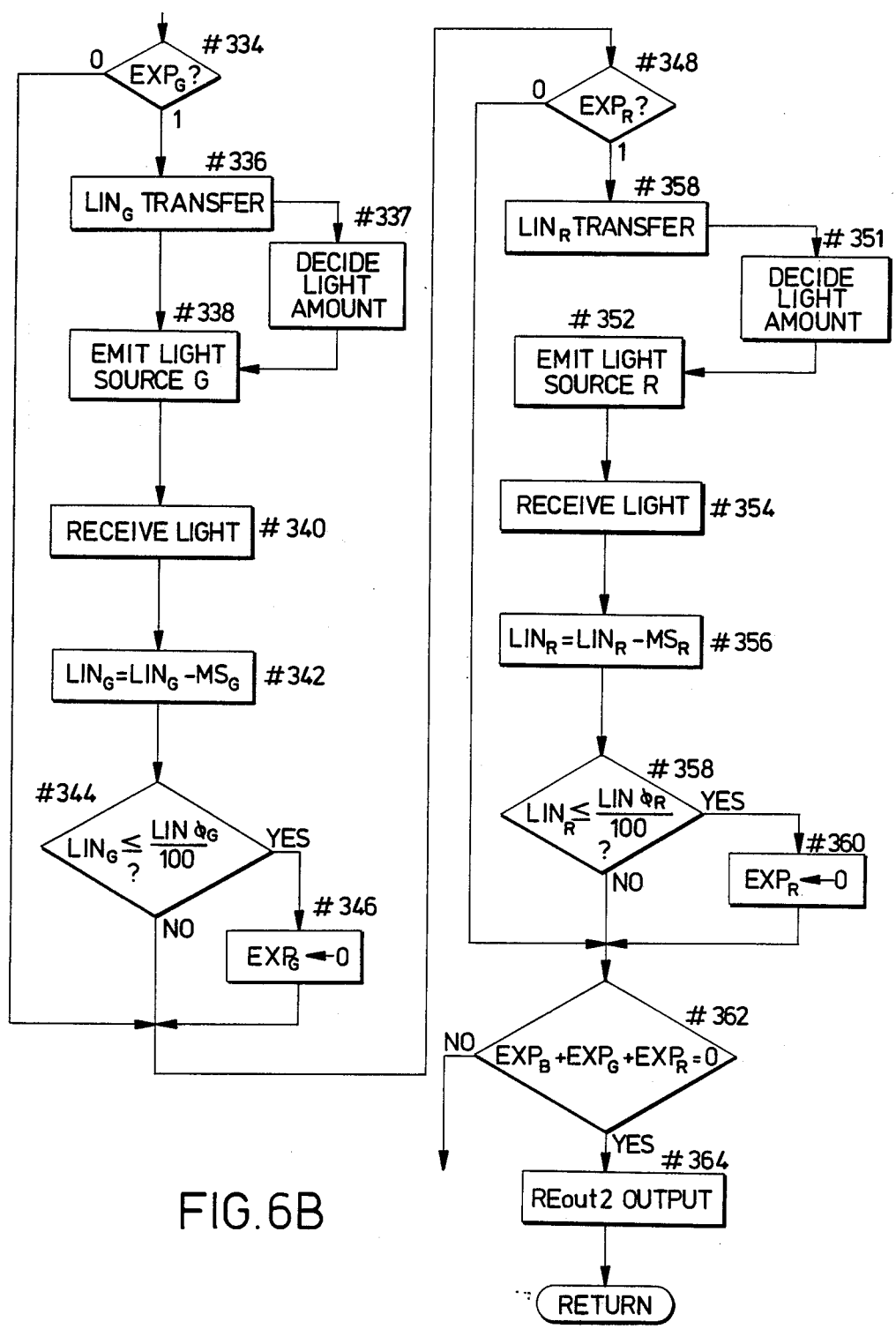
Figure 7:
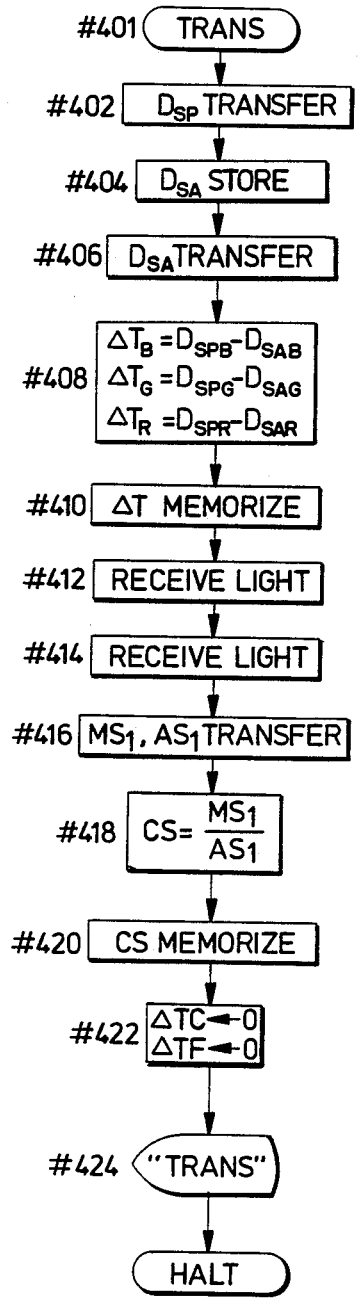
Figure 8:
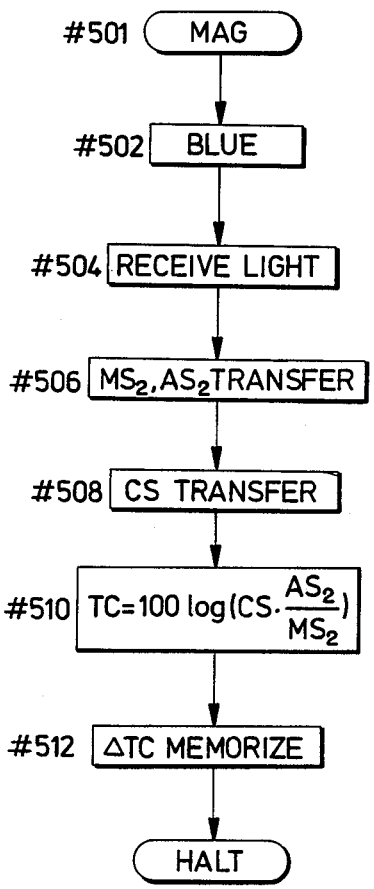
Figure 10:
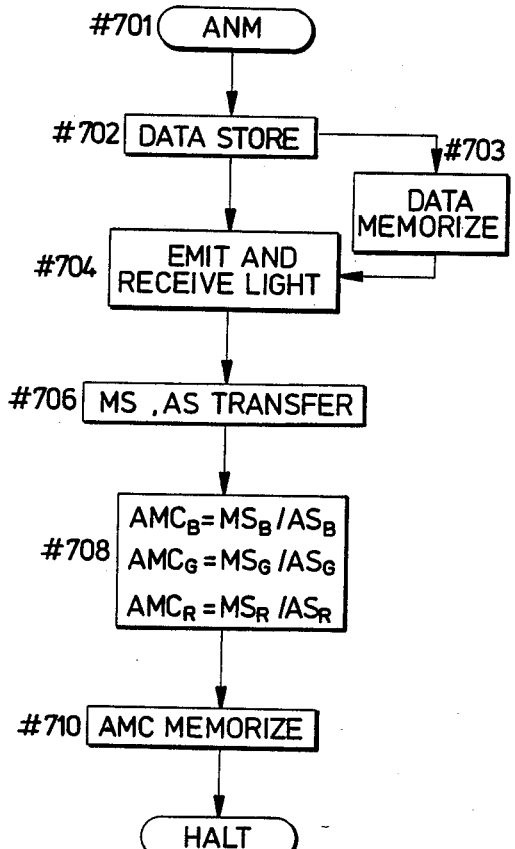
Figure 11:
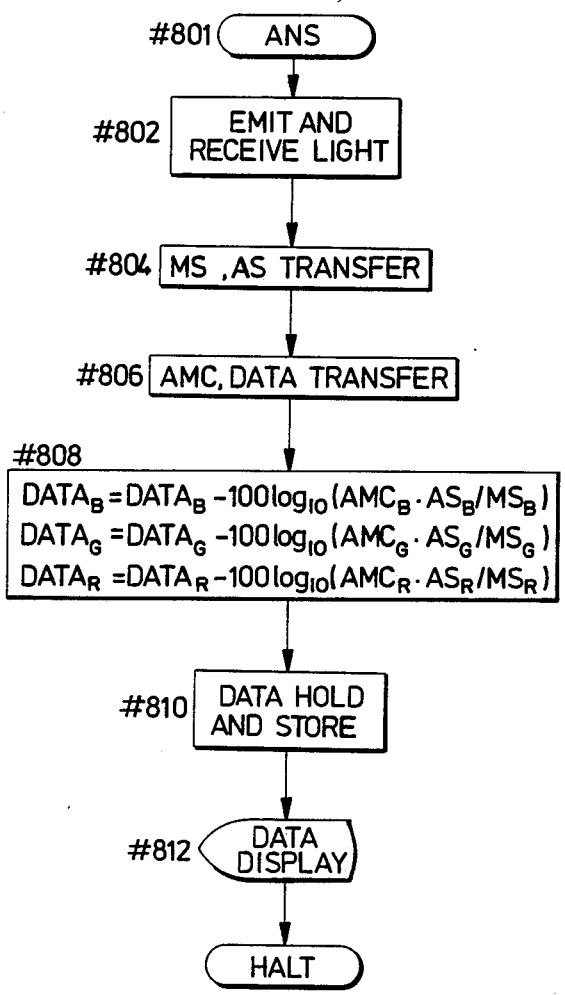

If ORG key 61, ENT key 62, TRN key 63, MAG key 64, ANM key 65, ANS key 66 or EXP key 67 are turned on, the control means 69 receives an ON signal via one of the lines 26 through 32, and the control means 69 returns from the HALT condition and judges at respective steps #103 through #109 which key is turned on. If ORG key 61 is turned on, the operation in accordance with the ORG flowchart shown in FIG. 5 is carried out at step #921. If ENT key 62 is turned on, the operation in accordance with the ENT flowchart shown in FIG. 4 is carried out at step #911. If TRN key 63 is turned on, the operation in accordance with the TRN flowchart shown in FIG. 7 is carried out at step #401. If MAG key 64 is turned on, the operation in accordance with the MAG flowchart shown in FIG. 8 is carried out at step #501. If ANM key 65 is turned on, the operation in accordance with the ANM flowchart shown in FIG. 10 is carried out at step #701. If ANS key 66 is turned on, the operation in accordance with the ANS flowchart shown in FIG. 11 is carried out at step #801. If EXP key 67 is turned on, the operation in accordance with a subroutine shown in FIGS. 6a and 6b is carried out at step #110.

Next, the operations and functions of the present enlarger are particularly described.

A. Calculation of the Best Print Data for the Standard Exposed Film

If ORG key 61 is turned on, the control means 69 outputs a signal to the memory means 71 via line 14 at step #922 of the flowchart shown in FIG. 5 so as to set the value of OTF flag in the memory means 71 to "0". Next, at step #923, the control means 69 outputs a signal to the display 60 via line 33, and if the "TRANS" indication is displayed on the display 60, said indication is turned off.

An explanation about OTF flag and the indication of "TRANS" is made later.

Next, the standard exposed film is set in the well-known manner on the film set position 53, the condition of the optical system is determined so as to obtain a desired magnification, and the focusing operation is carried out. The exposure data, that is, $DATA_B$, $DATA_G$ and $DATA_R$, are continually manually set in the setting means 74.

Figure 3:
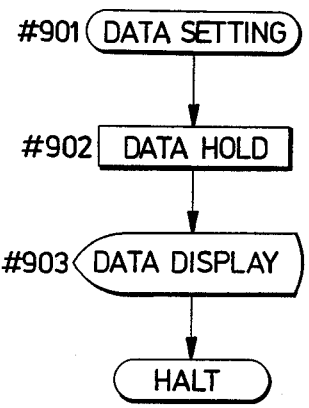
FIG. 3 is a flowchart which particularly shows a routine for an operation when the exposure data are set.

If the exposure data are set in the setting means 74, the control means 69 returns from the HALT condition and carries out the operation in accordance with the flowchart shown in FIG. 3. At step #902, the control means 69 outputs a signal to the buffer 73 via line 35 so that the exposure data, or $DATA_B$, $DATA_G$ and $DATA_R$, may be held in the buffer 73. At the next step #903, the control means 69 outputs a signal to the display 60 via line 33 so that the data held in the buffer 73 may be displayed on the display 60. If the exposure data displayed on the display 60 is satisfactory for a user, said user may turn on ENT key 62.

Provided that ENT key 62 is turned on, in accordance with the flowchart shown in FIG. 4, at step #912, the control means 69 outputs a signal to the memory means 72 via line 13 so that the exposure data held in the buffer 73 may be stored in the memory means 72. Then, a printing paper is put on the easel plane 57 and EXP key 67 is turned on.

Now, an explanation is made about the operation after the EXP key 67 is turned on in accordance with the flowchart shown in FIGS. 6a and 6b. The control means 69 receives a REin signal from the external roll easel 79 via the roll easel I/O port 78 and judges whether said REin signal permits the exposure operation or not. The roll easel 79 outputs a signal for interrupting the exposure operation while the printing paper is being wound. If the REin signal interrupts the exposure operation, the control means 69 returns to step #302 and waits for the REin signal to permit the exposure operation. If the REin signal permits the exposure operation, the control means 69 outputs a signal $REout_1$ to the roll easel 79 via the roll easel I/O port 78 indicating that the exposure operation is under way. Then, the exposure data, or $DATA_B$, $DATA_G$ and $DATA_R$, stored in the memory means 72 are transferred to the calculating means 70 via line 9. The value of OTF flag memorized in the memory means 71 and later discussed $\Delta T_B$, $\Delta T_G$, $\Delta T_R$ and $\Delta TC$ are transferred to the calculating means 70. If the value of OTF flag is "1", the control means proceeds to step #312, or if said value is "0", proceeds to step #314. Now the value of OTF flag is "0" so the following formulas are carried out in the calculating means 70 at step #314:

$$LIN_b = K \cdot 10^{(DATAB/100)}$$

$$LIN_g = K \cdot 10^{(DATAG/100)}$$

$$LIN_R = K \cdot 10^{(DATAR/100)}$$

in which $LIN_b$, $LIN_G$ and $LIN_R$ represent amount of light to be emitted in the linear scale and K is a constant value. At step #316, $LIN_B$, $LIN_G$ and $LIN_R$ are substituted for $LIN\phi_B$, $LIN\phi_G$ and $LIN\phi_R$, respectively ($LIN\phi_B$, $LIN\phi_G$ and $LIN\phi_R$ represent total amount of light to be emitted). At step #318, $EXP_B$, $EXP_G$ and $EXP_R$ are set to "1", respectively.

The following steps #320 through #322 show a flow of the light emitting operation by the light source B.

At step #320, the calculating means 70 judges whether the value of $EXP_B$ is "1" or "0". Since the value of $EXP_B$ has just been set to "1", $LIN_B$ is transferred to the control means 69 at step #322. The control means 69 decides the amount of light to be emitted from the light source B in accordance with the transferred value of $LIN_B$, and outputs a signal, corresponding to said amount of light to be emitted, to the light emitting circuit 51 via line 19.

The light emitting circuit 51 controls the light source B to emit the desired amount of light in accordance with said signal and, at the same time, outputs a signal via line 18 so that cell 55 may receive a part of the emitted light, so that the light measuring circuit 58 may convert the amount of light received by cell 55 into a digital signal, and so that $MS_B$ representing said digital signal may be transferred to the calculating means 70.

Upon receiving $MS_B$, the calculating means 70 carries out the following formula:

$$LIN_b(REST) = LIN_B(NEED) - MS_B$$

and compares $LIN_B$ and $LIN\phi_B/100$. If the result of the above operation is:

$$LIN_B \leq LIN\phi_B/100$$

$EXP_B$ is set to "0" at step #332 and the flow proceeds to step #334. On the other hand, if $LIN_B$ is larger than $LIN\phi_B/100$, the flow proceeds to step #334 just as it is.

The criteria of decision is chosen under 1% of $LIN\phi_B$, for if the ratio of $LIN_B$ to $LIN\phi_B$ is under 2%, $LIN_B$ becomes under 1CC in the logarithmic compression scale (CC scale).

If $EXP_B$ is judged as "0" at step #320, the flow proceeds to step #334, too. In the same way, the light emitting operation by the light source G is carried out at steps #334 through #346 and the light emitting operation by the light source R is carried out at steps #348 through #360. If the following formula:

$$EXP_B + EXP_G + EXP_R = 0$$

is fulfilled at step #362, the control means 69 outputs a signal $REout_2$ to the roll easel 79 via the roll easel I/O port 78 indicating that the exposure operation is completed.

If the above mentioned formula, $EXP_B + EXP_G + EXP_R = 0$ is not fulfilled, the flow returns to step #320, and the light emitting operation by respective light sources B, G and R are repeated.

That is to say, when $LIN_B$, $LIN_G$ and $LIN_R$ become under 1% of $LIN\phi_B$, $LIN\phi_G$ and $LIN\phi_R$, respectively, the exposure operation is completed.

The routine of steps #320 through #362 is suitable for pulse light sources, for example, xenon tubes.

The detailed description for the light emission control method has already been shown in U.S. Pat. No. 4,551,011.

When a best is taken for the standard exposed film, the data stored in the memory means 72 and displayed on the display 60 at that time are the best print data for the standard exposed film obtained by the present enlarger. If a best print is not taken, it is necessary that another exposure data be set in the setting means 74 and the same operations as above mentioned be repeated.

B. Memorization of the Translate Data

The difference between the best print data for the standard exposed film obtained by the external analyzer 80 and that by the present enlarger must be memorized, so that the best print can always be taken even if the exposure data obtained by the external analyzer 80 are directly fed into the present enlarger. An object of this clause B is to take the difference, or the translate data.

To begin with, the best print data for the standard exposed film, or $D_{SPB}$, $D_{SPG}$ and $D_{SPR}$, obtained by the present enlarger in clause A above are set in the setting means 74.

The set data are held in the buffer 73 and displayed on the display 60 as mentioned above. If the displayed data are correct, ENT key 62 is turned on and $D_{SPB}$, $D_{SPG}$ and $D_{SPR}$ are stored in the memory means 72. Next, the best print data for the standard exposed film, or $D_{SAB}$, $D_{SAG}$ and $D_{SAR}$, measured by the external analyzer 80 are set in the setting means 74. If the data displayed on the display 60 are correct, TRN key 63 is turned on. Before TRN key 63 is turned on, $D_{SPB}$, $D_{SPG}$ and $D_{SPR}$ are in the memory means 72 and $D_{SAB}$, $D_{SAG}$ and $D_{SAR}$ are in the buffer 73, respectively.

If TRN key 63 is turned on, the present enlarger carries out the operation in accordance with the flowchart shown in FIG. 7. First, the best print data obtained by the present enlarger and stored in the memory means 72, or $D_{SPB}$, $D_{SPG}$ an $D_{SPR}$, are transferred to the calculating means 70 via line 9, while the best print data measured by the external analyzer 80 and held in the buffer 73, or $D_{SAB}$, $D_{SAG}$ and $D_{SAR}$, are stored in the memory means 72 via line 7. Next, said $D_{SAB}$, $D_{SAG}$ and $D_{SAR}$ are transferred to the calculating means 70 via line 9.

At step #408, the following formulas are carried out in the calculating means 70:

$$\Delta T_B = D_{SPB} - D_{SAB}$$

$$\Delta T_G = D_{SPG} - D_{SAG}$$

$$\Delta T_R = D_{SPR} - D_{SAR}$$

The results of the above calculations, that is, $\Delta T_B, \Delta T_G$ and $\Delta T_R$ are transferred to the memory means 71 and memorized therein. At step #412, the control means 69 outputs a signal to the light emitting circuit 51 via line 19 so that the light source B may emit a predetermined amount of light. In this case, cell 55 receives a part of the light emitted from the light source B, the light measuring circuit 58 converts the analog signal corresponding to the amount of light received by cell 55 into a digital signal, and the control means 69 outputs a signal via line 18 so that the converted digital signal (hereinafter, called "$MS_1$") may be transferred to the calculating means 70 via line 1. The control means 69 outputs a signal via line 18 so that cell 56 may receive a part of the light emitted from the light source B and irradiating on the easel plane 57 through the optical system, so that an analog signal corresponding to the amount of the light received by cell 56 may be converted into a digital signal by the light measuring circuit 59, and so that the converted digital signal (hereinafter, called "$AS_1$") may be transferred to the calculating means 70 via line 18. The reason why only the light source B emits a light here is that the above mentioned calculating operation concerns the detection of a change in the optical system.

Further, a film must be taken off and cell 56 must be set at the predetermined position on the easel plane 57.

At step #418, according to transferred $MS_1$ and $AS_1$, the following formula is carried out in the calculating means 70:

$$CS = MS_1/AS_1$$

and CS is memorized in the memory means 71 via line 5. $\Delta TC$ memorized in the memory means 71 is set to "0", while OTF flag is set to "1". A signal is outputted via line 33 from the control means 69 so that the indication of "TRANS" may be displayed on the display 60, said indication meaning that TRN key 63 is turned on. That completes the $\Delta T_B$, $\Delta T_G$ and $\Delta T_R$ setting operation. That is to say, if OTF flag is "1", the exposure data fed by the external analyzer 80 are translated in accordance with the translate data and the exposure operation is carried out. (See step #310 and #312 shown in FIG. 6.)

Further, $\Delta TC$ is variable in accordance with the detecting operation of a change of the optical system as stated later.

C. A Change of the Condition of the Optical System

The translate data in clause B are set under a condition of the optical system where the best print data for the standard exposed film are obtained by the enlarger. To carry out the exposure operation under another condition of the optical system, the following operation is required. To begin with, the film set position 53 with a film being set thereon is adjusted so that a desired condition of the optical system may be obtained. (Here, the printing magnification is especially taken in consideration.) After the focusing operation, cell 56 is set at a predetermined position on the easel plane 57 and the film is taken off. Now, it is supposed that the translate data is memorized in the enlarger and the indication of "TRANS" is displayed on the display 60, said indication meaning that the translate data is memorized. After the above mentioned operation is completed, if MAG key 64 is turned on, a change of the printing magnification is detected in accordance with the flowchart shown in FIG. 8.

First, as at step #412 shown in FIG. 7, the control means 69 outputs a signal to the light emitting circuit 51 via line 19 so that the light source B may emit a light of predetermined amount. In this case, cell 55 receives a part of the light emitted from the light source B, the light measuring circuit 58 converts the received analog signal corresponding to the amount of the light received by cell 55 into a digital signal, and the control means 69 outputs a signal via line 18 so that the converted digital signal (hereinafter, called "$MS_2$") may be transferred to the calculating means 70 via line 1. The control means 69 outputs a signal via line 18 so that cell 56 may receive a part of the light emitted from the light source B and irradiating on the easel plane 57 through the optical system, so that an analog signal corresponding to the amount of the light received by cell 56 may be converted into a digital signal by the light measuring circuit 59, and so that the converted digital signal (hereinafter, referred to as "$AS_2$") may be transferred to the calculating means 70 via line 2. Next, the control means 69 outputs a signal via line 14 so that CS data in the memory means 71 may be transferred to the calculating means 70. The calculating means 70, upon receiving said CS data, carries out the following formula:

$$\Delta TC = 100 \cdot \log_{10}(CS \cdot AS_2/MS_2)$$

and said $\Delta TC$ is memorized in the memory means 71 via line 5. $\Delta TC$ is the revised data to revise the exposure data in accordance with the change of the printing magnification and is represented in the logarithmic compression scale (CC scale).

Further, the above operation with MAG key 64 turned on is available when the aperture of lens 54 is changed as well as when the printing magnification is changed. Thus, the present enlarger is capable of detecting both the magnification and the aperture of the optical system thereof.

D. The Printing Operation in Accordance with the Exposure Data Obtained by the External Analyzer For carrying out a printing operation using the data obtained by the external analyzer 80, the memorizing operation of the translate data as mentioned in clause B or the detecting operation of a change of the condition of the optical system as mentioned in clause C is required. If the translate data are memorized in the present enlarger, the data obtained by the external analyzer 80 are translated into data suitable for the most preferable exposure operation by the enlarger. Thus, the data from the external analyzer 80 can be fed, just as it is, into the input means 76.

If data are fed into the input means 76 by the external analyzer 80, the external ANALY operation begins. The external ANALY operation is explained in accordance with the flowchart shown in FIG. 9.

First, the external data fed into the input means 76 are held temporarily in the input means 76. Next, the deciding means 75 outputs a signal to the control means 69 via line 21 so that the control means 69 may output a signal for prohibiting the operation in accordance with the setting of data in the setting means 74 or in accordance with some key being turned on. One of the data held in the input means 76, that is, the data corresponding to ID No., or identification number, are fed into the deciding means 75. (Hereinafter, said data is referred to as "IDin".) Next, the data of ID No. allotted to respective enlargers, said data being memorized in the ID setting means 77 (hereinafter, called "IDset"), are fed into the deciding means 75 via line 23. At stop #610, IDin and IDset, fed into the deciding means 75, are compared. If it is decided that IDin is equal to IDset, the flow proceeds to step #612. If it is decided that IDin is not equal to IDset, the flow proceeds to step #622.

If it is decided at step #610 that IDin is equal to IDset, ones of the data held in the input means 76, that is, the exposure data, or $DATA_B$, $DATA_G$ and $DATA_R$, are fed into the deciding means 75. The deciding means 75 judges whether the data are the exposure data or not and transfers said data to the buffer 73 via line 20. The buffer 73 holds the data, and the contents thereof are displayed on the display 60. Next, the deciding means 75 outputs a signal to the control means 69 via line 21 so that the control means 69 may carry out the same operation as it does when ENT key 62 is turned on. Thus, the data held in the buffer 73 is stored in the memory means 72 via line 7. Further, the deciding means 75 outputs a signal to the control means 69 via line 21 so that the control means 69 may carry out the same operation as when EXP key 67 is turned on. Therefore, the exposure operation is carried out in accordance with the EXP subroutine shown in FIG. 6.

Now at step #310 shown in FIG. 6, OTF flag in the memory means 71 is "1", for the translate data are memorized in the memory means 71. (See step #422 shown in FIG. 7.) At step #312, the following formulas are carried out in the calculating means 70:

$$DATA_R(BEST\ PRINT) = DATA_R(EXT.\ ANALY) + \Delta T_R - \Delta TC$$

$$DATA_G(BEST\ PRINT) = DATA_G(EXT.\ ANALY) + \Delta T_G - \Delta TC$$

$$DATA_B(BEST\ PRINT) = DATA_B(EXT.\ ANALY) + \Delta T_B - \Delta TC$$

and the exposure data obtained by the external analyzer 80, or $DATA_R$, $DATA_G$ and $DATA_B$, are revised in accordance with the translate data for taking a best print with the enlarger. Thus, if the condition of the optical system is changed, the data are revised in accordance with the changed condition so that the best print may be taken.

The same operations as explained in clause A are then carried out in accordance with the flowchart shown in FIG. 6. After the exposure operation is completed and the flow returns from the EXP subroutine, at step #622 shown in FIG. 9, the deciding means 75 outputs a signal to the control means 69 via line 21 so that the control means 69 may output a signal permitting the operation in accordance with the setting of data in the setting means 74 or in accordance with some key being turned on, and the control means 69 comes to a halt.

In this way, the printing operation using the exposure data fed by the external analyzer is completed.

E. Memorization of the Analyze Data for the Function of the Internal Analyzer

By having the function of an internal analyzer, the present enlarger can print a selected point of a film to be printed with the same color balance and density as those of the specific point of an arbitrary film selected before the printing operation.

First, the best print data for the arbitrary film is calculated in accordance with the calculating operation of the best print data for the standard exposed film as mentioned in clause A. Next, cell 59 is set at a specific point in a projected image of the film on the easel plane 57 having the specific color balance and density.

The best print data for the arbitrary film obtained as stated above, or $D_{SAB}$, $D_{SAG}$ and $D_{SAR}$, are set in the setting means 74. Then said data are held in the buffer 73 and displayed on the display 60. If the displayed data are correct, ANM key 65 is turned on.

The control means 69 receives an ON signal from ANM key 65 via line 29. An explanation about the operations after ANM key 65 is turned on is made in accordance with the flowchart shown in FIG. 10.

First, the data, or $D_{SAB}$, $D_{SAG}$ and $D_{SAR}$, held in the buffer 73 are stored in the memory means 72 via line 7 and then memorized in the memory means 71. Next, the control means 69 outputs a signal via line 19 so that respective light sources R, G and B may emit a predetermined amount of light at a predetermined timing. At the same time, the control means 69 outputs a signal via line 18 so that cell 55 may receive a part of the light emitted from respective light sources R, G and B in accordance with the timing of emission, and that the light measuring circuit 58 may convert analog signals corresponding to the amount of light received by cell 55 from the respective light sources into digital signals $MS_B$, $MS_G$ and $MS_R$. These digital signals are transferred to the calculating means 70 via line 1. The control means 69 also outputs a signal via line 18 so that cell 56 may receive the light emitted from respective light sources R, G and B through the optical system for irradiating the easel plane 57 in accordance with the timing of emission, and that the light measuring circuit 59 may convert analog signals corresponding to the amount of light received by cell 56 from the respective light sources to digital signals $AS_B$, $AS_G$ and $AS_R$. These digital signals are transferred to the calculating means 70 via line 2. The calculating means 70, receiving the data of $MS_B$, $MS_G$, $MS_R$, $AS_B$, $AS_G$ and $AS_R$ corresponding to the respective light sources, carries out the following formulas:

$$AMC_B = MS_B/AS_B$$

$$AMC_G = MS_G/AS_G$$

$$AMC_R = MS_R/AS_R$$

Then said data $AMC_B$, $AMC_G$ and $AMC_R$ are memorized in the memory means 71 via line 5, and the flow comes to a halt. The analyze data for the function of the internal analyzer, or $AMC_B$, $AMC_G$ and $AMC_R$ are now memorized in memory means 71.

F. Calculation of the Exposure Data by the Function of the Internal Analyzer

For calculating the exposure data so that a selected point of a film to be printed may be printed with the same color balance and density as the specific point of the arbitrary film memorized in clause E, first, the film to be printed is set on the film set position 53 and the condition of the optical system, such as its magnification and aperture is set. Next, cell 56 is put on a specific point of the projected image on the easel plane 57 that is required to be printed with the same color balance and density as the memorized specific point, and then, ANS key 66 is turned on.

An explanation is made for the operation after ANS key 66 is turned on, in accordance with the flowchart shown in FIG. 11. At steps #802 through #806, as well as at steps #704 through #706 shown in FIG. 10, the control means 69 outputs a signal via line 19 so that the respective light sources R, G and B may emit a predetermined amount of light at a predetermined timing. At the same time, the control means 69 outputs a signal via line 18 so that cell 55 may receive a part of the light emitted from respective light sources R, G and B in accordance with the timing of emission, and that the light measuring circuit 58 may convert the analog signals corresponding to the amount of the light received by cell 55 from the respective light sources to digital signals $MS_G$ and $MS_R$. These digital signals are transferred to the calculating means 70 via line 1. The control means 69 also outputs a signal via line 18 so that cell 56 may receive the light emitted from respective light sources R, G and B through the optical system for irradiating the easel plane 57 in accordance with the timing of emission, and so that the light measuring circuit 59 may convert analog signals corresponding to the amount of the light received by cell 56 from the respective light sources to digital signals $AS_B$, $AS_G$ and $AS_R$. These digital signals are transferred to the calculating means 70 via line 2.

Next, the data $AMC_B$, $AMC_G$ $AMC_R$, $D_{SAB}$, $D_{SAG}$ and $D_{SAR}$ corresponding to the respective light sources are transferred to the calculating means 71. Then, the following formulas are carried out in the calculating means 71:

$$DATA_B = D_{SAB} - 100 \cdot \log_{10}(AMC_B \cdot AS_B/MS_B)$$

$$DATA_G = D_{SAG} - 100 \cdot \log_{10}(AMC_G \cdot AS_G/MS_G)$$

$$DATA_R = D_{SAR} - 100 \cdot \log_{10}(AMC_R \cdot AS_R/MS_R)$$

Calculated data, or $DATA_B$, $DATA_G$ and $DATA_R$ are stored in the memory means 72 via line 10 and held in the buffer 73 via line 32. The data held in the buffer 73 are displayed on the display 60.

That completes the calculating operation of the exposure data by the function of the internal analyzer. If the printing operation is carried out using said exposure data, the same color balance and density as those of the memorized specific point are obtained. In this case, if the indication of "TRANS" is displayed on the display 60, ORG key 61 is turned on, OTF flag in the memory means 71 comes to "0", the indication of "TRANS" is turned off, and then, EXP key 67 may be turned on.

Now, returning to FIG. 1, an explanation is made for the operation of the power source detecting means 68. This power source detecting means 68 detects whether the power source of the present enlarger is turned on or off, and outputs a signal to the control means 69 via line 37 when said power source is turned on and via line 38 when said power source is turned off. As shown in the flowchart shown in FIG. 13, when the power source is turned off, the control means 69 receives a signal via line 38 and, at step #961, outputs a signal via lines 13, 14 and 35 so that the OTF, $\Delta TC$, $\Delta T_B$, $\Delta T_G$, $\Delta T_R$, CS, $AMC_B$, $AMC_G$ and $AMC_R$ in the memory means 71 and the exposure data stored in the memory means 72 or held in the buffer 73 may be transferred to the calculating means 70. The calculating means 70 adds all the transferred data and the sum thereof is memorized in SUM in the memory means 71. After the power source is turned off, the data in the memory means 71, in the memory means 72 and in the buffer 73 are held by the backup battery 81.

In FIG. 1, the memory means 71, the memory means 72 and the buffer 73 are illustrated as divisional blocks, respectively, but in practice, all said blocks compose a RAM.

Figure 12:
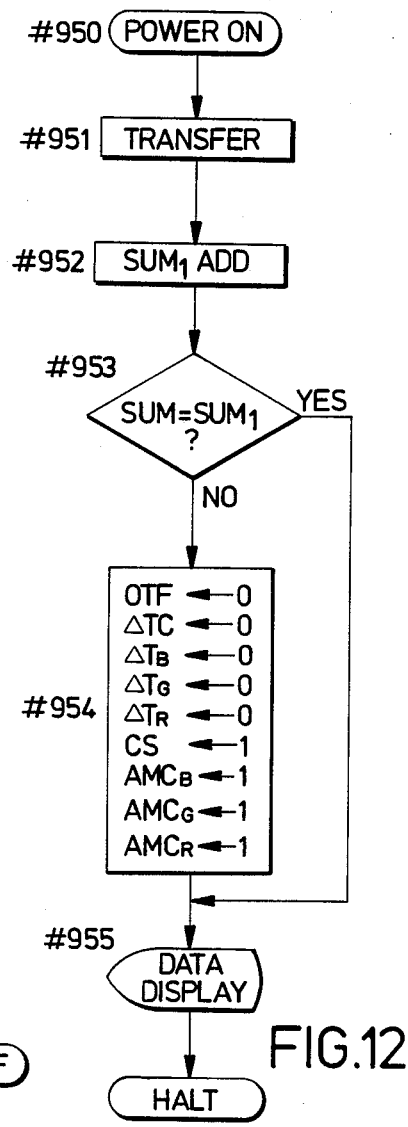
Figure 13:
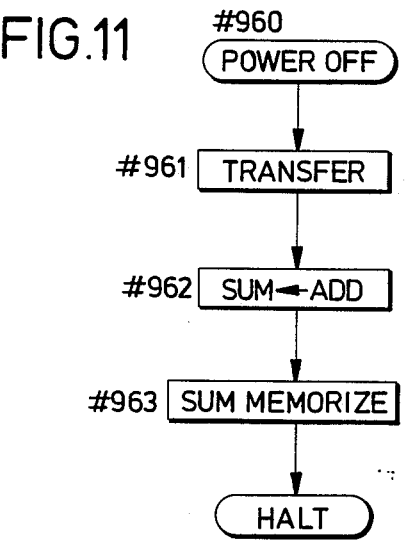
FIG. 13 is a flowchart which particularly shows a routine for an operation when the power source is turned off.

As shown in the flowchart of FIG. 12, when the power source is turned on, the control means 69 outputs a signal via lines 13, 14 and 35 at step #915 so that OTF, $\Delta TC$, $\Delta T_B$, $\Delta T_G$, $\Delta T_R$, CS, $AMC_B$, $AMC_G$, $AMC_R$ and SUM in the memory means 71 and the exposure data stored in the memory means 72 and held in the buffer 73 may be transferred to the calculating means 70.

The calculating means 70 adds all the transferred data except SUM, and the result of the addition is referred to as "$SUM_1$".

At step #953, SUM and $SUM_1$ are compared, a SUM is equal to $SUM_1$, the exposure data in the buffer 73 is displayed on the display 60 at step #955.

If SUM is not equal to $SUM_1$, at step #954, OTF, $\Delta TC$, $\Delta T_B$, $\Delta T_G$, and $\Delta T_R$ in the memory means 71 are set to "0" and CS, $AMC_B$, $AMC_G$ and $AMC_R$ are set to "1", respectively. At step #955, the exposure data in the buffer 73 are displayed on the display 60. Depending on the above mentioned construction, if the memorized data at the moment the power source is turned off are correctly backed up, the backed up data can be utilized just like that.

Although the present invention has fully been described in connection with the preferred embodiment thereof with reference to the accompanying drawings, it is to be noted that various changes and modifications are apparent to those skilled in the art. Such changes and modifications are to be understood as being included within the scope for the present invention as defined by the appended claims.

We claim:

1. A photographic enlarger having an optical system operable by using exposure data fed by an external analyzer which analyzes a developed film comprising:
    light emitting means for emitting light;
    first measuring means for directly measuring the amount of light emitted from the light emitting means;
    second measuring means for measuring the amount of light emitted from the light emitting means by way of the optical system;
    setting means for setting a first exposure data indicative of a first best print data fed by the external analyzer with respect to a predetermined standard film exposed under a standard condition and for setting a second exposure data indicative of a second best print data which is determined through trial printing of the standard film under a first condition of the optical system of said enlarger;
    memorizing means for memorizing a first ratio of the amount of light measured by said first measuring means to that measured by said second measuring means when said light emitting means emits light under the first condition of the optical system;
    first operation means for calculating a first revised data, which is representative of a change in the condition of the optical system, in accordance with said first ratio and a second ratio of the amount of light measured by said first measuring means to that measured by said second measuring means when said light emitting means emits light under a second condition of the optical system that is different from the first condition of the optical system;
    input means for inputting a third exposure data from the external analyzer;
    second operation means for calculating the amount of light to be emitted from the said light emitting means in accordance with said first, second and third exposure data and said first revised data; and
    controlling means for controlling said light emitting means to emit light of the amount calculated by said second operation means.

2. A photographic enlarger according to claim 1 further comprising, third operation means for calculating a second revised data, which is representative of a deviation between said first and said second exposure data, in accordance with said first and second exposure data, and said second operation means calculates a final exposure data indicative of the amount of light to be emitted from said light emitting means by revising said third exposure data with said first and second revised data.

3. A photographic enlarger having an optical system capable both of being with and without an external analyzer which analyzes a developed film to generate an external exposure data comprising:

light emitting means for emitting light;

setting means for setting a first exposure data indicative of a first best print data fed by the external analyzer with respect to a predetermined standard film exposed under a standard condition and for setting a second exposure data indicative of a second best print data which is determined through trial printing of the standard film;

measuring means for measuring the amount of light emitted from the light emitting means by way of a film and the optical system of said enlarger;

memorizing means for memorizing an amount of light received by said measuring means by way of the standard film when said light emitting means emits a predetermined amount of light;

first operation means for calculating a first revised data in accordance with the first and second exposure data;

second operation means for calculating a second revised data in accordance with the amount of light in said memorizing means and the amount of light received by said measuring means through a developed film to be printed when said light emitting means emits the predetermined amount of light; and control means for controlling the amount of light to be emitted from said light emitting means using an external exposure data revised with said first revised data when the printing operation is carried out using the external analyzer and for controlling the amount of light to be emitted from said light emitting means using the second exposure data revised with said second revised data when the printing operation is carried out without the external analyzer.

4. A photographic enlarger having an optical system operable by using exposure data fed by an external analyzer which analyzes a developed film, comprising:

light emitting means for emitting light;

outputting means for outputting a first revised data which is representative of a change in the condition of the optical system and for outputting a second revised data which is representative of a deviation between exposure data obtained by said enlarger and the external analyzer with respect to the same developed film;

input means for inputting an external exposure data from the external analyzer;

operation means for calculating a final exposure data indicative of the amount of light to be emitted form said light emitting means by revising said external exposure data with said first and second data; and control means for controlling said light emitting means to emit light of the amount calculated by said operation means.

* * * * *